United States Patent
Sorkin et al.

[15] 3,698,449
[45] Oct. 17, 1972

[54] FABRICATION OF LIQUID CRYSTAL DEVICES

[72] Inventors: Howard Sorkin, Berkeley Heights; Richard Ira Klein, Edison, both of N.J.

[73] Assignee: RCA Corporation

[22] Filed: June 23, 1971

[21] Appl. No.: 155,897

[52] U.S. Cl. ................................. 141/1, 141/92
[51] Int. Cl. ........................... B65b 1/04, B65b 3/04
[58] Field of Search ....178/7.7; 350/150; 141/1, 4–8, 141/48, 92, 63

[56] References Cited

UNITED STATES PATENTS 2,433,177    12/1947    Wainio ..................... 141/48

*Primary Examiner*—Houston S. Bell, Jr.
*Attorney*—Glenn H. Bruestle

[57] ABSTRACT

To provide a uniform composition of the liquid crystal material throughout the device, the interior surfaces of the device are coated or contacted, prior to filling with the liquid crystal material, with certain additive materials normally contained in the liquid crystal material to improve the device performance.

4 Claims, 1 Drawing Figure

PATENTED OCT 17 1972 3,698,449
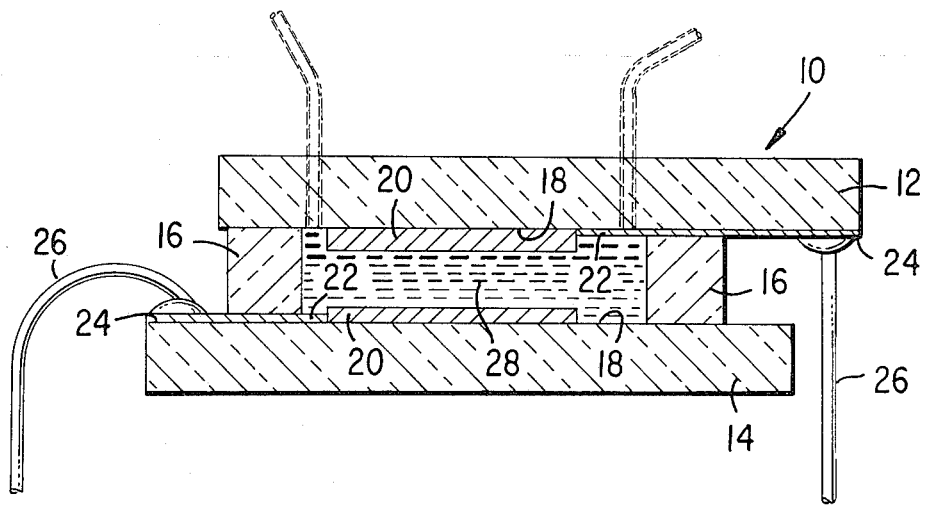

FABRICATION OF LIQUID CRYSTAL DEVICES

BACKGROUND OF THE INVENTION

This invention relates to the fabrication of liquid crystal devices.

One known type of liquid crystal device comprises a container, electrodes on the walls of the container, and a film of liquid crystal material therewithin. By applying a voltage between various pairs of electrodes, portions of the liquid crystal film in the fields of the electrode pairs can be reversibly switched between light scattering and light transparent states.

A fairly large number of liquid crystal materials are known. At least some of these materials are rather complex, and contain various additive materials for achieving certain desired results. For example, in certain liquid crystal materials, one additive material, such as anisylidene-p-aminophenol, is used to improve the alignment capability of the material, i.e., the ability of the optical domains of the material to properly align with one another to provide the film state of light transparency, and another additive material, such as hexadecylpyridinium bromide, is used to promote the state of light scattering when a voltage is applied between the device electrodes.

A major problem in the past has been that of providing the various additive materials in the proper quantities where needed within the device. For example, it was discovered, after much investigation by the inventors herein, that during the filling of the container with the liquid crystal material, adsorption by the surfaces of the container of the various ingredients of the material appears to occur at different rates, whereby the composition of the liquid crystal material within the device varies depending upon the degree of contact of the liquid crystal material with the container surfaces. This results in variations, from part to part of the device, in the device response and appearance.

Also, while the presence of certain additive materials is necessary to achieve certain desirable characteristics, it often occurs that these materials also produce undesirable characteristics. For example, in one liquid crystal material, the additive material used to promote light scattering is also effective to lower the electrical resistivity of the liquid crystal material composition. This raises the power consumption of the device which, in some instances, as when the device is battery operated, is undesirable. Thus, in the past, various compromises in device performance and appearance would often have to be made in order to achieve a balance between the desirable and undesirable effects of a given additive material.

DESCRIPTION OF THE DRAWING

The drawing is a view, in cross-section, of a typical known type of liquid crystal device.

DETAILED DESCRIPTION OF THE INVENTION

With reference to the drawing, a liquid crystal device 10 of known type is shown. The device 10 comprises a pair of oppositely disposed substrates 12 and 14 maintained in spaced-apart relation by means of a shim 16, e.g., of glass frit. On the inside surface 18 of each substrate 12 and 14 is disposed an electrode 20 of, e.g., a transparent material such as tin oxide. Means for making electrical connections to each of the electrodes 20 comprise conductive strips 22 on the substrate surfaces 18 which extend between each of the electrodes 20 and an outer exposed portion 24 of the substrates 12 and 14, where terminal leads 26 are bonded thereto. Disposed between the substrates 12 and 14 is a thin film 28 of a liquid crystal material, the thickness of the film 28 being in the order of one-half mil.

Means for fabricating devices of the type shown in the drawing are generally known. In the filling of the device with the liquid crystal material, according to one known technique, two tubulations (shown in dashed lines in the drawing) are provided at opposite ends of the device which communicate with the interior thereof. The remote end of one of the tubulations is immersed in a body of liquid crystal material, and the other tubulation is connected to a source of vacuum. By exhausting the device, the liquid crystal material is drawn thereinto.

Examples of liquid crystal devices, methods of fabricating and operating such devices, and examples of various liquid crystal materials are provided in U.S. Pat. Nos. 3,499,112, issued to Heilmeier, et al., on Mar. 3, 1970, and U.S. Pat. No. 3,499,702, issued to Goldmacher, et al., on Mar. 10, 1970. The instant invention has utility in the fabrication of a wide variety of liquid crystal devices using various liquid crystal materials as disclosed in these two patents.

Of great importance in connection with the instant invention is not only our discovery of solutions to the heretofore described problems of liquid crystal devices, but our discovery of the nature of the problems themselves. For example, in the early development of liquid crystal devices, various satisfactory experimental compositions of liquid crystal materials were developed. When it came to utilizing various ones of these liquid crystal compositions in commercial devices manufactured according to more mass production techniques, however, it was found that it was extremely difficult to fabricate devices having uniform characteristics over the extent of each device. Thus, in some cases, even without the application of a voltage between the device electrodes, portions of the liquid crystal film were at least partially light scattering. Conversely, other portions of the liquid crystal film, often within the same device, refused to become light scattering when the voltage was applied.

At first we thought that these problems were related to the presence of contaminants in the devices. Great efforts were expended in providing "cleaner" techniques in the preparation of the device containers and the liquid crystal materials. While some improvements resulted, the basic problems remained.

We eventually discovered that these problems at least appeared to be most pronounced, or localized, at the interface between the liquid crystal material and the surfaces of the container contacted by the liquid crystal material. This discovery was not easy to make owing to the extreme thinness of the liquid crystal films used in the devices. From this determination, and further investigations, we discovered that these problems are caused by variations in the composition of the liquid crystal material along the interface between the liquid crystal material and the container surfaces. As above noted, we believe that this variation in the composition of the liquid crystal material is caused by differential adsorption, or stripping, of various ingredients from the liquid crystal material by the container surfaces during the filling of the devices with the liquid crystal material. That is, as the liquid crystal material moves through the small space between the container walls during the filling of the container, various ingredients of the liquid crystal material are stripped therefrom with the result that the material reaching the areas of the container most remote from the inlet tubulation are depleted of certain ones of the ingredients. This problem is especially prevalent in large area devices.

A solution which we finally arrived at is to first thoroughly "wet" or pre-contact the container surfaces to be contacted by the liquid crystal material in the finished devices with the various ingredients or additives of the liquid crystal material which tend to be stripped therefrom, and to thereafter fill the container with the liquid crystal material. Thus, after such initial or pre-contacting of the container surfaces with the liquid crystal ingredients, in some cases to the point of saturating the surfaces with these ingredients, upon filling the containers with the liquid crystal material, the various ingredients within the liquid crystal material are not stripped therefrom.

Various methods are possible to achieve this pre-contacting operation. In one method, a preliminary quantity of the liquid crystal material itself can be flushed through the container with the result that various ingredients of the liquid crystal material are stripped therefrom to desirably pre-contact or dope the container surfaces. A sufficiently large quantity of the liquid crystal material is used whereby a thorough flushing of the container occurs. Thereafter, a new or "fresh" batch of the liquid crystal material is used to fill the container. Since the container surfaces have been pre-contacted or pre-doped with the various liquid crystal material ingredients, little or no additional stripping of these ingredients from the fresh batch of liquid crystal material used in the final filling of the container occurs, whereby the composition of the liquid crystal material throughout the container is substantially uniform.

In another method, a gaseous medium carrying various ones of the additive materials which tend to be stripped from the liquid crystal material, or a vapor of these additive materials alone, is flushed through the cell prior to the filling of the cell with the liquid crystal material. The additive materials are thus deposited on the interior surfaces of the liquid crystal cell.

Another method which can be used involves an improved process described in a patent application filed concurrently herewith by Herman Stern, and entitled "Fabrication of Liquid Crystal Devices." As described and claimed therein, a large quantity of the liquid crystal material, several times the volume of the container, is pumped through the container to thoroughly flush out the interior thereof while the walls of the container are alternately outwardly and inwardly bowed. In this manner, the preferred paths of the liquid crystal material through the container are caused to vary, whereby all the surface portions of the container are thoroughly contacted and wetted by the liquid crystal material prior to the tipping off of the fill tubulations to trap a final quantity of the liquid crystal material within the container.

Another aspect of this invention from which special advantages are derived is now described. In one mode of operation of liquid crystal devices, such as that described in the aforecited U.S. Pat. No. 3,499,112, light scattering is achieved by causing turbulence of the liquid crystal material by the movement of charged ions therethrough. The ions are provided, in some instances, by an additive material which is ionizable in the liquid crystal medium. For example, in various ones of the liquid crystal materials disclosed in the aforementioned U. S. Pat. No. 3,499,112, the additive material dodecylisoquinolium bromide can be used. One problem associated with the use of such ionizing additive materials is that they reduce the electrical resistivity of the liquid crystal material, thereby increasing the power consumption of the device during operation thereof. While this is generally of no particular problem when the device is operated from a large source of power, in some instances, such as when the devices are operated from a battery, low power consumption for longer battery life is greatly to be desired.

Heretofore, it was found that unless a minimum quantity of the ionizing additive material was present in the liquid crystal material, portions of the liquid crystal device would suffer from "hang-up," i.e., these portions would not become light scattering when a voltage was applied thereto. This minimum quantity of the additive material, however, tended to excessively lower the electrical resistivity of the liquid crystal material, hence increase the power used by the device.

In accordance with the instant invention, we discovered that by pre-contacting the container surfaces with the ionizing additive material, the "minimum" quantity of the additive material required to avoid the "hang-up" problem is significantly reduced. The reason is as follows.

According to the prior practice, as heretofore explained, during the cell filling process, some of the ingredients are stripped from the liquid crystal material resulting in a variation in the composition of the liquid crystal material throughout the device. By providing (without knowing why in the prior art process) a relatively large minimum quantity of the ionizing additive material, the stripping of some of this additive material still leaves a sufficient quantity of the additive material to allow proper operation of the device. That is, even at the particular location of the cell where the maximum stripping of the ionizing ingredient occurs, the remaining quantity of the additive material at this location is still sufficiently high for adequate device performance. At other locations of the cell, however, where the concentration of the additive material is somewhat higher, owing to a lesser degree of stripping, more of the additive material is present than is actually required. This excessive additive material causes a lowering of the electrical resistivity of the liquid crystal material to an extent that is not actually necessary for proper operation of the device. Thus, by pre-contacting the container surfaces with the ionizing additive material, in accordance with the instant invention, the concentration of the additive material in the liquid crystal material used to fill the cell need only be that which is necessary to provide proper device operation. That is, an excessive quantity of the additive material to make up for amounts of the additive material stripped from the liquid crystal material is not necessary since the pre-contacting process of the instant invention largely avoids or completely eliminates such stripping action.

Any of the above-described processes for pre-contacting the cell interior surfaces can be used. Moreover, owing to the pre-coating of the cell surfaces, in some cases, the final quantity of the liquid crystal material in the completed device need contain, as it is introduced into the device, none of the ionizing material. While not known for certain, it is believed that some of the additive material on the cell interior surfaces becomes dissolved in the liquid crystal material, thereby providing the necessary ions.

Specific examples of the invention are now described. One material having utility as an ionizing additive in various liquid crystal compositions such as ones disclosed in U. S. Pat. No. 3,499,112 is hexadecylpyridinium bromide. According to one embodiment of this invention, a solution of this material (HDPB), comprising 0.01–0.2 percent, by weight, of the HDPB, balance isopropanol, is flushed through the cell via the two tubulations. The extent of flushing is not critical, three to five times the cell volume of solution can be used. The excess solution is then pumped out of the cell by drawing a vacuum through one of the tubulations. The cell is then heated in a vacuum oven at a moderate temperature, in the range 30° – 60° C., so as not to decompose the additive material, for 3–4 hours. The dried cell is then filled with the liquid crystal material, and the cell sealed off.

While the liquid crystal material used in the above example can contain some of the HDPB, in the order or 0.001 percent, by weight, in some instances, the liquid crystal material can contain no HDPB at all. In the past, obtaining adequate device performance required the use of the HDPB in the liquid crystal material at a concentration in the order of 0.05 percent. Using a liquid crystal material containing no HDPB, in accordance with the method of this invention, the electrical resistance of the cells is increased by a factor in the order of 100 in comparison with the prior art devices.

In another embodiment of the invention, a mass of the HDPB is gently heated in a closed container to a temperature in the order of 65° C., and the vapors so produced are passed through the liquid crystal cell maintained at a temperature of about 95° C. Preferably, to obtain more uniform coating of the cell interior surfaces, the vapor is caused to flow through the cell in one direction, for a period of time in the order of 15 minutes, and then caused to flow through the cell in the other direction, as by admitting the vapor into the cell through the other tubulation, for about the same period of time.

Comparing the above-described two methods, somewhat better results, with respect to the uniformity of coating of the cell surfaces, are obtained using the liquid carrier method.

The suitability of the various disclosed methods of pre-contacting the container surfaces is dependent upon the particular additive materials involved. The use of a gaseous medium for the pre-contacting process, for example, preferably requires an additive material, such as the HDPB, which has a reasonably high vapor pressure. In the usual case, however, the medium to convey the additive material in the pre-contacting process can always comprise the liquid crystal material itself, enough of the liquid crystal material being flushed through the cell to achieve the desired degree of pre-contacting.

We claim:

1. A method of fabricating a liquid crystal device comprising a container and a preselected liquid crystal material plus an additive material for said liquid crystal material within said container, said method comprising:
   pre-contacting a surface of said container to be contacted by said liquid crystal material with said additive material, and
   thereafter, filling said container with said liquid crystal material.

2. The method as in claim 1 wherein said pre-contacting step comprises flowing a medium containing a preselected proportion of said additive material through said container to thoroughly flush said container with said medium.

3. The method as in claim 2 wherein said flowing step comprises using a medium in which said proportion of additive material therein is greater than the proportion of said additive material in said liquid crystal material.

4. A method of fabricating a liquid crystal device comprising a container and a filling including a mixture of a liquid crystal and an additive material, said additive material tending to be taken up by the walls of said container and thereby depleted from said mixture, said method comprising:
   flushing said container with additive material; and then
   filling said container with said mixture;
   said flushing step serving to prevent depletion of said additive material from said mixture placed in said container by said filling step.

* * * * *